United States Patent [19]

Hurst

[11] 4,155,403
[45] May 22, 1979

[54] PROCESS FOR LOCATING RESIDUAL OR DORMANT HYDROCARBONS IN PETROLEUM RESERVOIRS

[76] Inventor: William Hurst, 1223 Bank of Southwest Bldg., Houston, Tex. 77002

[21] Appl. No.: 883,502

[22] Filed: Mar. 6, 1978

[51] Int. Cl.² ............................................. E21B 47/00
[52] U.S. Cl. ................................. 166/252; 166/250; 73/155
[58] Field of Search ................ 166/252, 250, 251, 314; 73/155

[56] References Cited

U.S. PATENT DOCUMENTS

| 2,429,577 | 10/1947 | French, Jr. .................. 166/250 UX |
| 3,319,713 | 5/1967 | Moore ................................ 166/252 |
| 3,496,768 | 2/1970 | Boucher ............................... 73/155 |

FOREIGN PATENT DOCUMENTS 439598  8/1974  U.S.S.R. ..................................... 73/155

OTHER PUBLICATIONS

Frick, *Petroleum Production Handbook*, Reservoir Engineering, vol. II, McGraw Hill Book Co., N.Y., 1962, 36-29 thru 36-34.

*Primary Examiner*—Stephen J. Novosad
*Attorney, Agent, or Firm*—Pravel, Wilson & Gambrell

[57] ABSTRACT

A subsurface earth formation or petroleum reservoir, either previously or presently producing petroleum hydrocarbons, such as oil and natural gas, is analyzed. From production data, the actual fluid flux of the hydrocarbons to each well penetrating the formation is obtained. By analyzing the actual fluid flux in the formation, areas in the formation where little if any hydrocarbon flow occurred are located. The areas so located are likely to contain dormant oil, which may be produced by new wells.

14 Claims, 7 Drawing Figures

FIELD

PROCESS FOR LOCATING RESIDUAL OR DORMANT HYDROCARBONS IN PETROLEUM RESERVOIRS

BACKGROUND OF THE INVENTION

1. FIELD OF INVENTION

The present invention relates to analysis of petroleum reservoirs.

2. DESCRIPTION OF PRIOR ART

It is well known that in each petroleum reservoir, whether one currently producing or one designated as depleted, hydrocarbon fluids, known as dormant oil (or gas), are left behind. Although secondary and tertiary recovery techniques may be used to recover portions of the reservoir contents from producing portions of the formation after initial production, dormant hydrocarbons, which have not entered into the main stream of fluid flow to the producing wells, remain in the formation.

SUMMARY OF THE INVENTION

Briefly, the present invention comprises a new and improved process for locating residual or dormant hydrocarbons in petroleum reservoir formations. A plot of ideal fluid flow potential and flow rate, determined from a potentiometric model of the known configuration of the reservoir, is formed on a map of the reservoir. Well locations are placed on the map at positions corresponding to their actual locations during production from the formation. The plot of ideal flow potential and rates, together with the actual production well locations, are then conformally mapped and plotted onto a rectilinear figure.

The actual flow rates and potential are determined and plotted onto the conformal map of the formation, and flow lines are formed on the map connecting points of equal fluid flow rate. With the present invention, it has been found that areas of the formation where actual fluid flow lines are widely spaced are likely prospects for containing dormant hydrocarbons, since the widely spaced fluid flow lines indicate the low rate of oil movement from such areas in the formation. Thereafter, a new well can be drilled into this area of the formation to recover these dormant hydrocarbons.

DESCRIPTION OF THE PREFERRED EMBODIMENT

Figure 1:
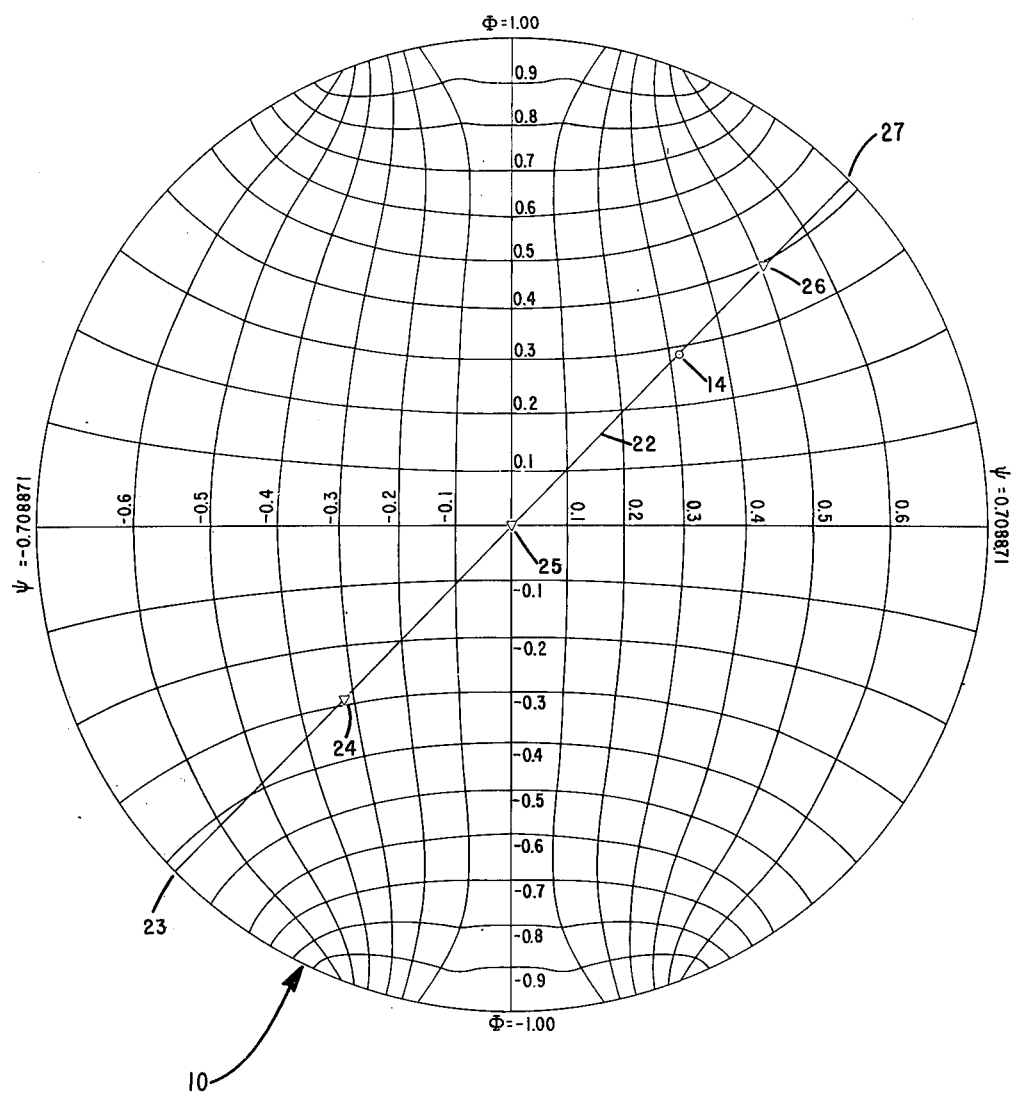
FIGS. 1 and 2 are diagrams of example petroleum reservoirs.
Figure 2:
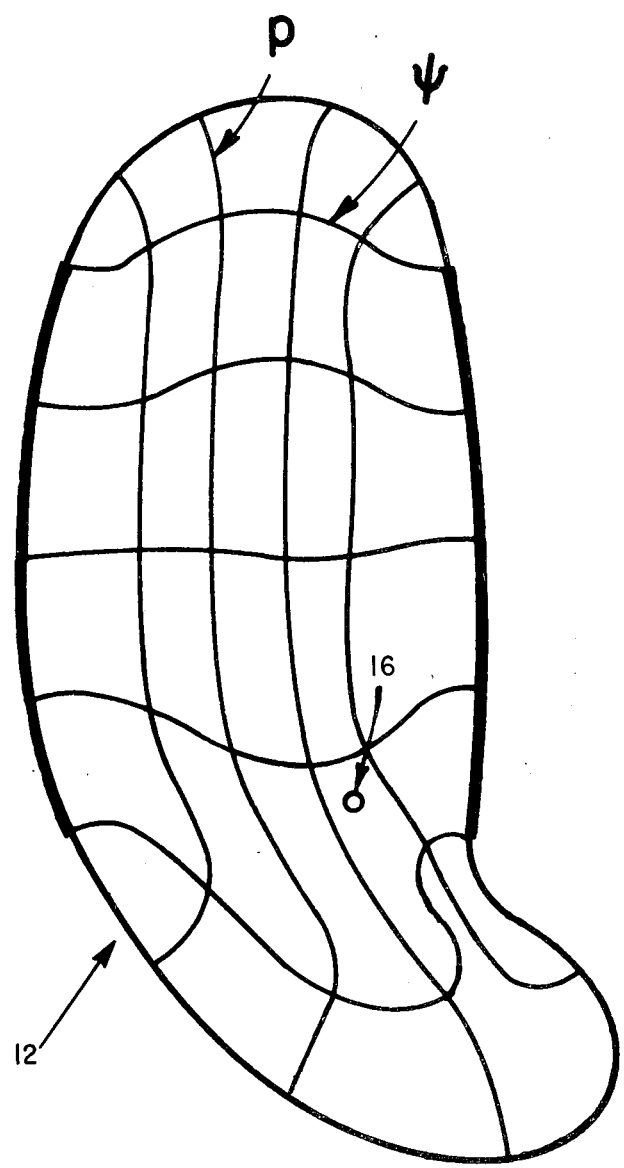

In the drawings, a first petroleum reservoir 10 (FIG. 1) and a second petroleum reservoir 12 (FIG. 2) are set forth by being depicted in plan views of the conventional type. The dimensions and configurations of the reservoirs 10 and 12 are obtained from seismic data, well logs and other geophysical data in the conventional manner. The first reservoir 10 is somewhat idealized, for reasons to be set forth, while the second reservoir 12 is representative of a more typical, irregularly shaped, hydrocarbon producing field or reservoir.

Each of the formations 10 and 12 has a well from which hydrocarbon production has in the past occurred, or, alternatively, is presently occurring. The wells are located on the reservoirs 10 and 12 at positions corresponding to their actual location with respect to the fields. The well in field 10 is designated by reference numeral 14, while the well in the field 12 is designated 16. It is to be understood that the presence of a single well in each of the fields 10 and 12 is only by way of example and that for other producing fields having multiple wells, each of such multiple wells actually present during production would be located on plots of the reservoir at locations corresponding to their actual location with respect to the field. Further, where the fields have known faults and shale lines, as is usual in petroleum reservoirs, these faults and shale lines may be incorporated into their respective locations in the field.

The petroleum formation plots 10 and 12 further have formed thereon lines interconnecting locations of equal fluid flow potential, $\Phi$, and fluid flow rate or stream line, $\Psi$. These values represent fluid flow rate and fluid flow potential for idealized conditions and do not represent, so far as Applicant is aware, actual values. Actual fluid flow potential $\Phi$ and fluid flow rate $\Psi$ cannot be measured, so far as Applicant is aware, for subterranean petroleum formations. These idealized values may, however, be obtained from potentiometric or electrolytic models of such formations. Examples of potentiometric and electrolytic modelling methods and models are set forth, by way of example, in "The Application of Electrical Models to the Study of Recycling Operations in Gas-Distillate Fields," *Production Practice*, p. 228 et seq., published by American Petroleum Institute, 1941, of which Applicant is coauthor, and in "Potentiometric-model Studies of Fluid Flow in Petroleum Rservoirs," *Trans. AIME*, p. 41 et seq., 1948. Faults and shale lines are also incorporated into the models where present in the reservoirs.

Figure 3:
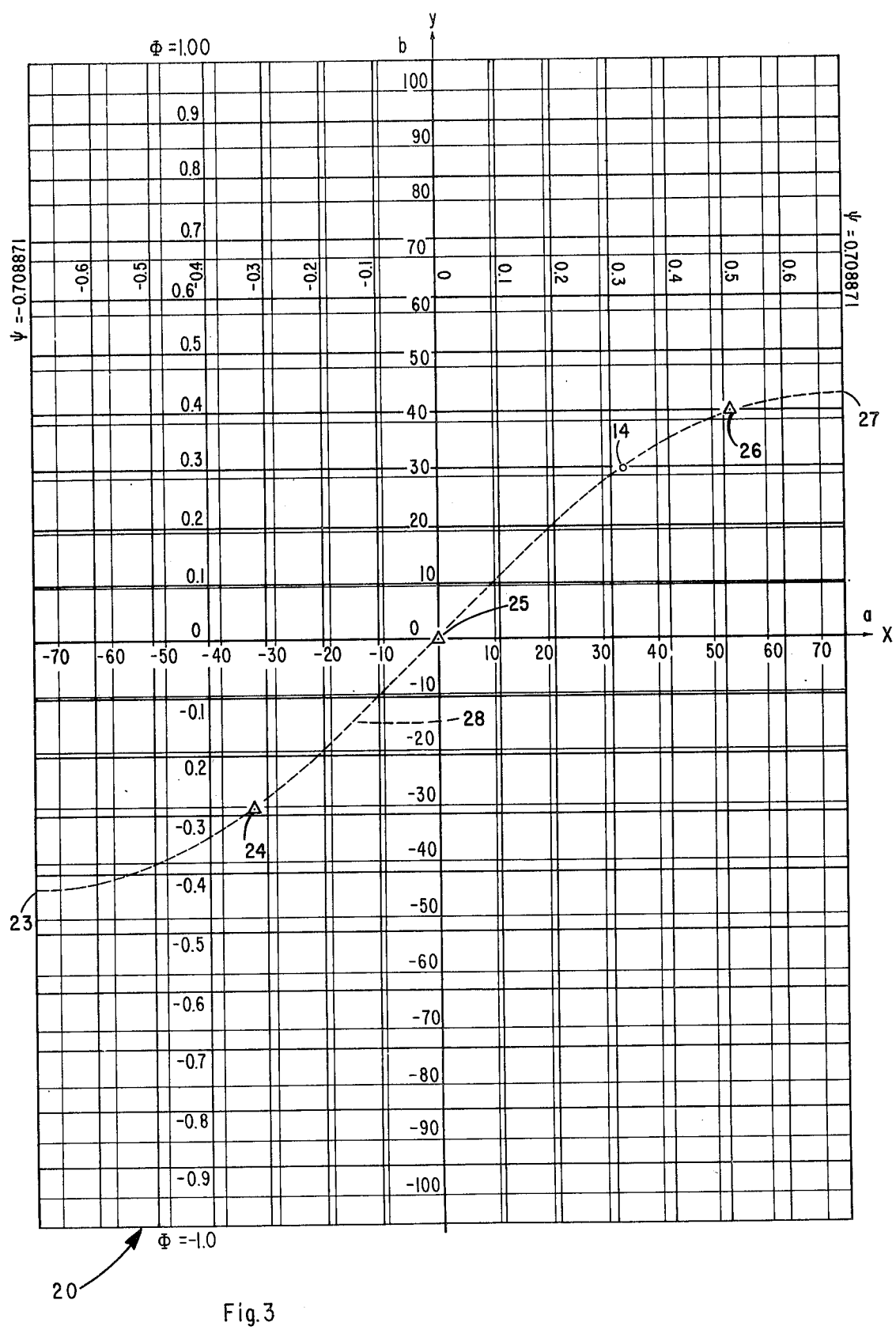
FIG. 3 is a conformal mapping of the plot of FIG. 1 into a rectangle.

With the present invention, Applicant has discovered that by means of procedures to be set forth below, residual or dormant hydrocarbons, either natural gas or petroleum, in the petroleum reservoir formations may be located by performance of the process of the present invention in the manner set forth below. Due to the generally irregular configuration of a substantial majority of producing formations, it is initially desirable to transfer the reservoir formation plot, such as those set forth in 10 and 12 to a more manageable model for analysis. Accordingly, the petroleum formation plot 10 is conformally mapped into a rectangle 20 (FIG. 3), either a square or rectangle.

Conformal mapping is a conventional data plotting technique, examples of which are set forth, by way of example, in: *Advanced Calculus*, W. Kaplan, Addison-Wesley Publications, 1959; *Hydrodynamics*, H. Lamb, Dover Publications, 1945; and *Advanced Calculus*, E. B. Wilson, Dover Publications, 1911-12.

In the conformally mapped plot 20 of the formation 10, there is continuous one-to-one correspondence of actual points in the reservoir, and the plots 20 and 10 are of equal area. By way of example, a line 22 connecting reference points 23, 24, 25, 26 and 27 in the plot 10 (FIG. 1) is represented in a plot 20 by a curved line 28, while the reference points 24 and 26 of the plot 10 are located at positions designated on the plot 20.

Once the formation has been conformally mapped, the actual fluid flow potential $\Phi$ is determined for a sufficient x,y co-ordinates of the plot 20 in order to determine variations in such fluid flow potential within the formation under investigation. According to Basset's formula, as set forth in the text *Hydrodynamics*, Vol. I, A. B. Bassett, p. 59, Dover Publications, 1961, the fluid flow potential $\phi$ at a particular x,y co-ordinate in a producing formation with respect to a well located at co-ordinates $x=\xi$ and $y=\eta$ is set forth below:

$$\phi(x,y) = \frac{1}{2} \sum_{j=-2}^{j=+2} \ln\left\{ \cosh\frac{\pi y}{2a} - \cos\frac{\pi}{2a}(x - \xi) \right\} + \quad (1)$$

$$\ln\left\{ \cosh\frac{\pi y}{2a} + \cos\frac{\pi}{2a}(x + \xi) \right\}$$

The rate of change of fluid flow potential $\phi$ with respect to particular co-ordinates x and y is thus, by means of differentiation, obtained as:

$$\frac{d\phi}{dx} = \frac{1}{2} \times \frac{\pi}{2a} \sum_{j=-2}^{j=+2} \left\{ \frac{\sin\frac{\pi}{2a}(x - \xi)}{\cosh\frac{\pi y}{2a} - \cos\frac{\pi}{2a}(x - \xi)} - \right. \quad (2)$$

$$\left. \frac{\sin\frac{\pi}{2a}(x + \xi)}{\cosh\frac{\pi y}{2a} + \cos\frac{\pi}{2a}(x + \xi)} \right\}$$

and $$\frac{d\phi}{dy} = -\frac{1}{2} \times \frac{\pi}{2b} \sum_{k=-2}^{k=+2} \left\{ \frac{\sin\frac{\pi}{2b}(y - \xi)}{\cosh\frac{\pi x}{2b} - \cos\frac{\pi}{2b}(y - \xi)} - \right. \quad (3)$$

$$\left. \frac{\sin\frac{\pi}{2b}(y + \xi)}{\cosh\frac{\pi x}{2b} + \cos\frac{\pi}{2b}(y + \xi)} \right\}$$

The actual rate of change of fluid flow potential in the formation plot 20 is then determined for the requisite number of data points or x,y co-ordinates in such plot to ensure an accurate and representative model of fluid flow rate $\psi$ throughout the formation, as actually present during production, is obtained, in a manner to be set forth. The actual velocity values so obtained in x,y co-ordinates are then converted to a polar, vectorial, co-ordinate system using the following relations:

$$\frac{d\phi}{dr} = \sqrt{\frac{d\phi}{dx}^2 + \frac{d\phi}{dy}^2} \quad (4)$$

expressing rate of change of fluid flow potential $\phi$ along a polar vector r for x, y coordinates, and $$\frac{d\phi}{dN} = \frac{d\phi}{dr} \sin(\tau - \theta) \quad (5)$$

where expressing rate of change of fluid flow potential $\phi$ along a line normal to the polar vector, $$\tau = \tan^{-1} \frac{\frac{d\phi}{dy}}{\frac{d\phi}{dx}} \quad (6)$$

Equations (4) through (6) are then used for each point of the radial lines to obtain a vector having a magnitude $\phi$ and an angle $\theta$, where $\theta$ defines the number of degrees that the vector radial arm of length r of the vector is positioned with respect to a 0° starting point, for each of the data points in the plot 20, so that the plotted results indicate the resultant effect on rate of change of fluid flow potential in both x and y co-ordinates.

The flow rate $\Psi$ at each of the data points in the field 20 is then obtained along the radial co-ordinates by integrating, for example according to Simpson's Rule, as set forth in the text *Hydrodynamics*, Lamb, Dover Publications, 1945, according to the following relation for each co-ordinate r in the plot 20:

$$\psi = \int_O^r \frac{d\phi}{dN} \times dr \quad (7)$$

Figure 4:
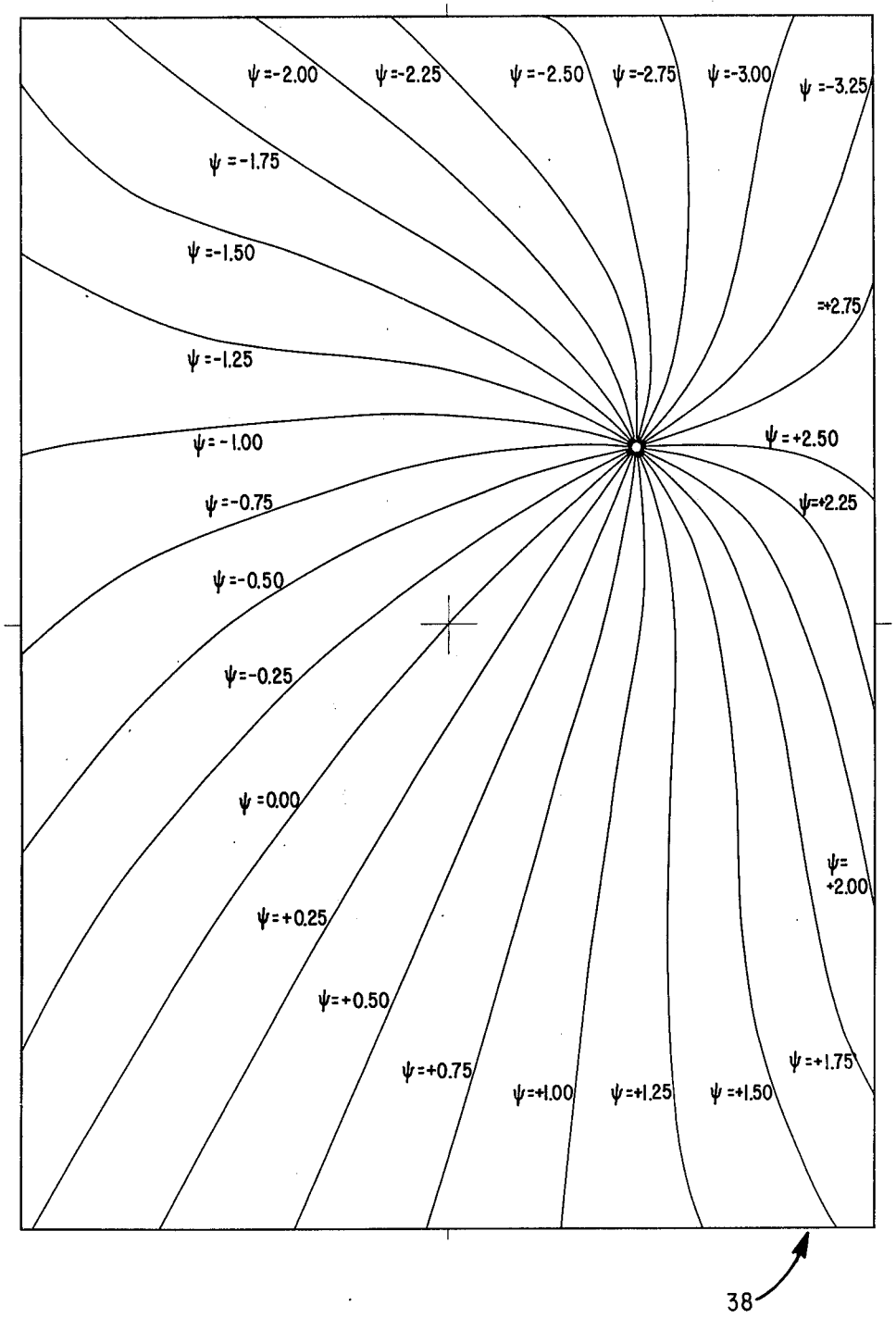
FIG. 4 is a plot of actual fluid flow lines obtained for the formation conformally mapped in FIG. 3.

The values of $\psi$ so obtained are then plotted for data points of interest by forming lines connecting positions of equal flow rate on a plot of the same configuration as the field 20, the results of which are shown in FIG. 4 as a plot 38.

Figure 5:
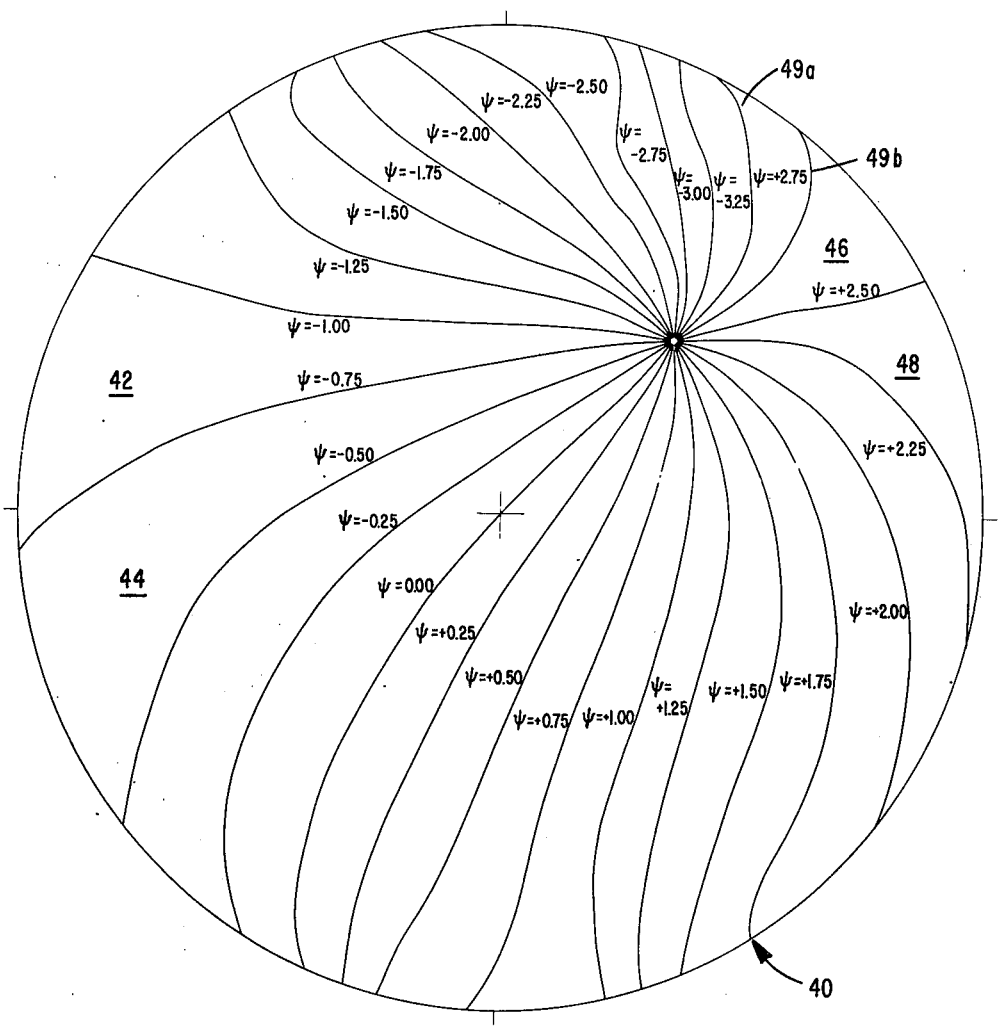
FIG. 5 is a plot of actual flow lines of FIG. 4 conformally mapped into the reservoir of FIG. 1.
Figure 6:
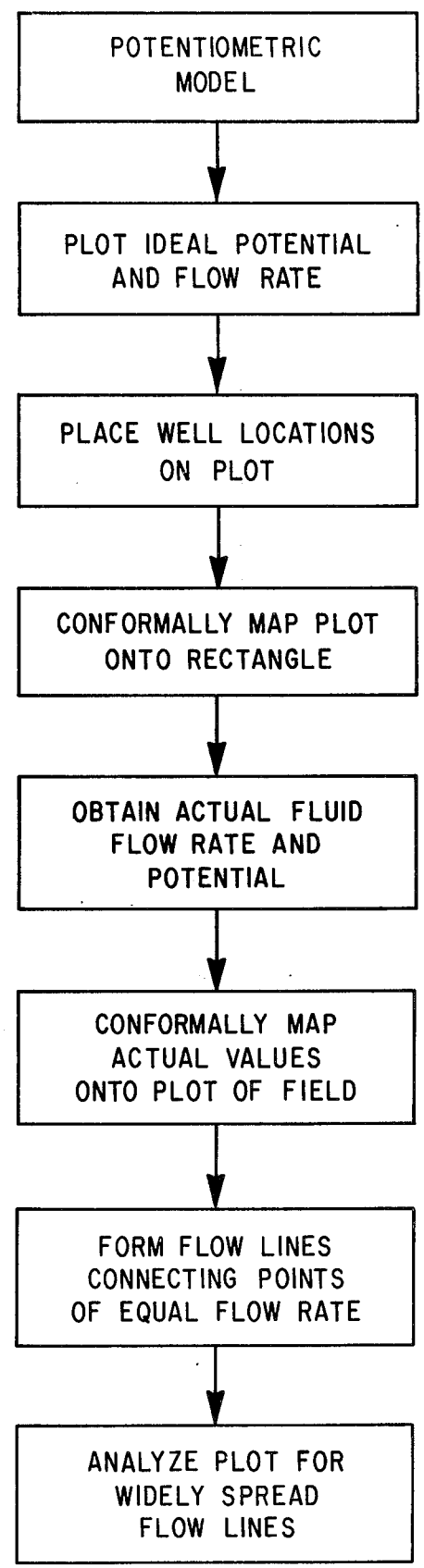
FIG. 6 is a process diagram of the steps of the present invention.

The plot 38 is then conformally mapped from the rectilinear configuration of FIG. 4 onto a plot of the configuration of the acutal field 10, in accordance with the conformal mapping technique set forth above. The results of such conformal mapping are set forth as a plot 40 (FIG. 5).

Attention is directed to those portions of the plot designated 42, 44, 46 and 48, having widely spaced lines of equal fluid flow rate $\psi$. Applicant has discovered, according to the present invention, that these are areas of the field 10 from which relatively low hydrocarbon production occurred in the formation 10. These areas are thus likely candidates for drilling of further wells and recovery of the dormant hydrocarbon fluid therefrom. As has been set forth above, the formation 10 is a relatively idealized one. Theoretical calculations based on a field of this configuration are set forth, by way of reference, in a textbook *Flow of Homogeneous Fluids*, J. W. Edwards, Inc., 1946, by M. Muskat, for selected positions in the field. As set forth in such text, the $P(t_D)$ function representing pressure drop P as a function of dimension less time $t_D$, and the rate of fluid flow on the line 22, $d\phi/dr$ are:

CHART I

| Reference Point | $P(t_D)$ | $d\phi/dr$ |
|---|---|---|
| 23 | 2.064070 | 0 |
| 24 | 2.276856 | −0.00884625 |
| 25 | 3.068147 | −0.0250 |
| Well 14 | 7.404591 | 1.00 |
| 26 | 4.512548 | +0.0253571 |
| 27 | 4.261294 | 0 |

By performing the process of the present invention, it has been determined that substantially identical results are obtained for like data points as those set forth in Chart I above. The following chart sets forth the values obtained according to the process of the present invention and conformally mapped onto the plot 40 for each data point of the values of the preceding Chart I:

CHART II

| Reference Point | P(t$_D$) | d$\phi$/dr |
|---|---|---|
| 23 | 2.039938 | 0 |
| 24 | 2.380106 | −0.00987429 |
| 25 | 3.286215 | −0.0254669 |
| Well 14 | 7.404591 | 1.00 |
| 26 | 4.527719 | +0.0252828 |
| 27 | 4.172058 | 0 |

From the foregoing, it can be seen that with the present invention a new and improved and highly effective technique for locating areas in producing formations where actual fluid flow was relatively low during production in the field, is set forth. Further, the present invention may be performed whether the field is now considered dormant, or from a field where production is currently in progress. With the present invention, formations previously felt to be uneconomical for petroleum production may be analyzed and areas where further production is still possible and feasible can be located. Attention is directed to FIG. 5 and the flow lines 49a and 49b therein representing cardinal values of flow rate of $\psi = 2.75$ and $\Psi = -3.25$. The total difference in these values is thus $\Psi = 6.00$, which approaches the known total flow rate of $2\pi$.

As an alternative technique of obtaining actual fluid flow potential, a model 50 (FIG. 7) having the conformally mapped rectilinear version of the field 10 at a center location thereof is surrounded by a plurality of rectangles each containing a point source at specified increments of a with respect to the x co-ordinate, $\xi$, and b with respect to the y co-ordinate, $\eta$, of the well 14.

Figure 7:
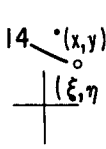
FIG. 7 is a plot from which an alternative method of obtaining actual flow lines may be obtained.

The rate of change of fluid flow potential $\phi$ with respect to an x,y co-ordinate in the model of FIG. 7 is set forth as:

$$\frac{d\phi}{dx} = \frac{(x-\xi)}{(x-\xi)^2 + (y-\eta)^2} + \sum_{\substack{j=-2,k=-2 \\ j=+2,k=+2}} \frac{(x-\xi_{j,k})}{(x-\xi_{j,k})^2 + (y-\eta_{j,k})^2} \quad (8)$$

and $$\frac{d\phi}{dy} = \frac{-(y-\eta)}{(x-\xi)^2 + (y-\eta)^2} - \sum_{\substack{j=-2,k=-2 \\ j=+2,k=+2}} \frac{(y-\eta_{j,k})}{(x-\xi_{j,k})^2 + (y-\eta_{j,k})^2} \quad (9)$$

The values of d$\phi$/dx and d$\phi$/dy so obtained are then utilized in the manner set forth above to convert the fluid flow potential $\phi$ to a polar co-ordinate vector and integration is then performed to determine the actual fluid flow $\psi$ for the field and the results so obtained are then conformally mapped in the foregoing manner so that analysis may be performed to again locate lines of relatively widely spaced fluid flow rate and, consequently, positions of the formation containing dormant hydrocarbons.

The method of the present invention is also adapted for use in pressure maintenance methods and enhanced recovery techniques in petroleum reservoirs. Where areas of widely spaced lines of equal fluid flow rate $\Psi$ are present in a reservoir, an additional, newly located well or wells may be drilled in such an area or areas. For pressure maintenance in the reservoir, water or other suitable fluid is then injected into the reservoir through the newly located well or wells. For enhanced recovery, a suitable surfactant, rather than water, is injected in order to increase recovery of oil from the formation.

The foregoing disclosure and description of the invention are illustrative and explanatory thereof and various changes in the size, shape and materials as well as in the details of the preferred embodiment may be made without departing from the spirit of the invention.

I claim:

1. A process for analyzing a petroleum reservoir formation to locate areas likely to contain dormant petroleum hydrocarbons in the formation, comprising the steps of:
   (a) forming a plot of ideal fluid potential and flow rate in the formation based on the configuration of the formation;
   (b) placing well locations at positions on the plot corresponding to at least one actual well location with respect to the reservoir;
   (c) obtaining a measure of actual fluid flow rate in the formation to the well locations; and
   (d) forming lines on the map connecting positions of equal flow rate to indicate actual movement of hydrocarbons during production from the formation, wherein dormant fluid may be located in areas of low flow rate.

2. The process of claim 1, wherein plural wells penetrate the reservoir formation, and wherein said step of placing well locations comprises:
   placing well locations at positions on the plot corresponding to the actual well locations of each of said plural wells.

3. The method of claim 1, further including the step of:
   drilling a well in an area of low flow rate located after performing said steps of forming lines.

4. The method of claim 1, wherein the petroleum reservoir formation contains dormant oil.

5. The method of claim 1, wherein the petroleum reservoir formation contains dormant natural gas.

6. The method of claim 1, wherein the plot of the formation is divided into horizontal (x) and vertical (y) co-ordinates along a co-planar horizontal surface and said step of obtaining a measure of actual fluid flow rate comprises the steps of:
   (a) obtaining the rate of change of flow rate with respect to the horizontal (x) co-ordinate;
   (b) obtaining the rate of change of flow rate with respect to the vertical (y) co-ordinate;
   (c) transferring the rates of change of flow with respect to horizontal and vertical co-ordinates to a rate of change of flow with respect to radial co-ordinates; and
   (d) integrating the rate of change of flow with respect to radial co-ordinates to obtain the measure of fluid flow rate.

7. The method of claim 1, wherein the plot of the formation is divided into horizontal (x) and vertical (y) co-ordinates along a co-planar horizontal surface and said step of obtaining a measure of actual fluid flow rate comprises the steps of:
   (a) obtaining the rate of change of flow rate with respect to the horizontal (x) co-ordinate;
   (b) obtaining the rate of change of flow rate with respect to the vertical (y) co-ordinate; and (c) integrating the rate of change of flow rate with respect to the horizontal and vertical co-ordinates to obtain the measure of fluid flow rate.

8. The process of claim 1, wherein plural wells penetrate the reservoir formation, and the plot of the formation is divided into horizontal (x) and vertical (y) co-ordinates along a co-planar horizontal surface and wherein:
  (a) said step of placing well locations comprising placing well locations at positions on the plot corresponding to the actual well locations of each of said plural wells; and
  (b) said step of obtaining comprises:
    (1) obtaining the rate of change of flow rate with respect to the horizontal (x) co-ordinate for each of the plural wells;
    (2) summing the rate of change of flow rate for each of the plural wells with respect to horizontal co-ordinates to obtain a composite rate of change with respect to horizontal co-ordinates;
    (3) obtaining the rate of change of flow rate with respect to the vertical (y) co-ordinate for each of the plural wells; and
    (4) summing the rate of change of flow rate for each of the plural wells with respect to vertical co-ordinates to obtain a composite rate of change with respect to vertical co-ordinates.

9. The method of claim 8, further including the steps of:
  (a) transferring the composite rates of change of flow with respect to horizontal and vertical co-ordinates to a composite rate of change of flow with respect to radial co-ordinates; and
  (b) integrating the composite rate of change of flow with respect to radial co-ordinates to obtain the measure of fluid flow rate.

10. The process of claim 1, further including the steps of:
  (a) conformally mapping the plot into a rectilinear map prior to said step of obtaining a measure of actual fluid flow rate; and
  (b) conformally mapping the actual fluid flow rate from the rectilinear map onto a map of the formation prior to said step of forming lines.

11. The method of claim 10, wherein said step of obtaining a measure of actual fluid flow rates in the formation comprises the steps of:
  (a) locating a plurality of simulated point sources in a square array external of said rectilinear map;
  (b) obtaining the rate of change of flow rate from the point sources to the well location; and
  (c) integrating the rate of change of flow rate from the point sources to obtain the measure of fluid flow rate.

12. The method of claim 1, further including the steps of:
  (a) forming a potentiometric model of the formation; and
  (b) obtaining from the potentiometric model the values of ideal fluid potential and flow rate used in said step of forming a plot.

13. The method of claim 1, further including the steps of:
  (a) drilling a well in an area of low flow rate located after performing said step of forming lines; and
  (b) injecting fluid through the drilled well into the reservoir for pressure maintenance therein.

14. The method of claim 1, further including the steps of:
  (a) drilling a well in an area of low flow rate located after performing said step of forming lines; and
  (b) injecting surfactants through the drilled well into the reservoir for increased recovery of petroleum hydrocarbons from the formation.

* * * * *